United States Patent
Choi

(10) Patent No.: US 10,198,980 B2
(45) Date of Patent: Feb. 5, 2019

(54) DISPLAY DEVICE AND METHOD FOR CONTROLLING THE SAME

(71) Applicant: SAMSUNG ELECTRONICS CO., LTD., Suwon-si (KR)

(72) Inventor: Hyun-seok Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 15 days.

(21) Appl. No.: 14/589,530

(22) Filed: Jan. 5, 2015

(65) Prior Publication Data

US 2015/0194087 A1 Jul. 9, 2015

(30) Foreign Application Priority Data

Jan. 6, 2014 (KR) .................. 10-2014-0001423
Sep. 11, 2014 (KR) .................. 10-2014-0120394

(51) Int. Cl.
*G06F 1/32* (2006.01)
*G09G 3/20* (2006.01)

(52) U.S. Cl.
CPC .................. *G09G 3/20* (2013.01); *G06F 1/32* (2013.01); *G06F 1/3218* (2013.01); *G06F 1/3265* (2013.01); *G09G 2330/021* (2013.01); *G09G 2330/022* (2013.01); *G09G 2330/026* (2013.01); *G09G 2370/06* (2013.01); *Y02D 10/153* (2018.01)

(58) Field of Classification Search
CPC ..... G06F 1/32; G06F 1/00; G06F 1/26; G06F 1/28
USPC ....... 713/300, 310, 320, 321, 322, 323, 324, 713/330, 340, 375
See application file for complete search history.

(56) References Cited

U.S. PATENT DOCUMENTS

| | | | |
|---|---|---|---|
| 5,991,822 A * | 11/1999 | Mealey | G06F 13/102 713/1 |
| 6,134,616 A | 10/2000 | Beatty | |
| 6,513,114 B1 * | 1/2003 | Wu | G06F 9/4411 713/2 |
| 8,452,995 B1 | 5/2013 | Lachwani et al. | |
| 8,843,607 B2 * | 9/2014 | Ayanam | H04L 12/6418 709/217 |

(Continued)

FOREIGN PATENT DOCUMENTS

CN 103262142 A 8/2013

OTHER PUBLICATIONS

Communication dated May 27, 2015 issued by the European Patent Office in counterpart European Patent Application No. 14198684.4.

(Continued)

*Primary Examiner* — Jaweed A Abbaszadeh
*Assistant Examiner* — Keshab R Pandey
(74) *Attorney, Agent, or Firm* — Sughrue Mion, PLLC

(57) ABSTRACT

A display device that supports a suspend mode and a method for controlling the same are provided. The display device includes a display configured to display an image; an interface configured to connect to at least one external device; and a controller configured to resume a configuration process of the display device in response to a command to turn on a power of the display device being input and control the interface to resume the at least one external device in response to the configuration process of the display device being completed.

16 Claims, 9 Drawing Sheets

(56) References Cited

U.S. PATENT DOCUMENTS

| | | |
|---|---|---|
| 9,135,086 B2 | 9/2015 | Fulkerson et al. |
| 2003/0177210 A1* | 9/2003 | Stringham ............ G06F 9/4411 709/222 |
| 2007/0165038 A1* | 7/2007 | Chiba ..................... G06F 21/10 345/520 |
| 2010/0064127 A1* | 3/2010 | Lee .................... G06F 11/1417 713/2 |
| 2010/0321071 A1* | 12/2010 | Sasaki .................... H03K 17/24 327/142 |
| 2011/0141360 A1 | 6/2011 | Choi et al. |
| 2012/0072912 A1* | 3/2012 | Fulkerson ................. G06F 9/54 718/100 |
| 2012/0144178 A1* | 6/2012 | Iyigun .................. G06F 9/4418 713/2 |
| 2012/0311312 A1 | 12/2012 | Hameed |
| 2013/0042098 A1* | 2/2013 | Baik .................... G06F 9/4418 713/2 |
| 2013/0159690 A1* | 6/2013 | Tsukamoto ............... G06F 1/26 713/2 |
| 2016/0072879 A1 | 3/2016 | Fulkerson et al. |

OTHER PUBLICATIONS

Communication dated Jun. 16, 2015 issued by the European Patent Office in counterpart European Patent Application No. 14198684.4.
Communication dated May 2, 2017 by the State Intellectual Property Office of P.R. China in counterpart Chinese Patent Application No. 201510004782.0.
Communication dated May 9, 2018, issued by the Korean Intellectual Property Office in counterpart Korean Application No. 10-2014-0120394.
Communication dated Jun. 27, 2018, issued by the State Intellectual Property Office of P.R. China in counterpart Chinese Application No. 201510004782.0.
Communication dated Jan. 16, 2018, issued by the State Intellectual Property Office of People's Republic of China in counterpart Chinese Application No. 201510004782.0.
Communication dated Nov. 15, 2018 issued by the European Patent Office in counterpart European Patent Application No. 14 198 684.4.

* cited by examiner

DISPLAY DEVICE AND METHOD FOR CONTROLLING THE SAME

CROSS-REFERENCE TO RELATED APPLICATIONS

This application claims priority from Korean Patent Application No. 10-2014-0001423, filed on Jan. 6, 2014, and Korean Patent Application No. 10-2014-0120394, filed on Sep. 11, 2014, in the Korean Intellectual Property Office, the disclosures of which are incorporated herein by reference in their entirety.

BACKGROUND

1. Field

Apparatuses and methods consistent with exemplary embodiments relate to a display device and a method for controlling the same, and more particularly to a display device, which consumes a short time in turning on the display device, and a method for controlling the same.

2. Description of the Related Art

Recently, with the development of display device technology, display devices include various features, such as content search and image capture, in addition to image display.

Accordingly, in order to perform content search or image capture using the Internet, many display devices include Wi-Fi modules or camera modules mounted thereon.

In particular, a distance between a controller and each module in a display device is relatively long, for example, in the range of 0.5 to 1 meter, and thus a Universal Serial Bus (USB) interface is mainly used in the display device.

In the case of using the USB interface, however, it takes a long time in resuming respective modules even if the USB interface operates in a suspend mode for quick booting.

For example, a kernel module that uses Linux operating system (OS) has a structure that can perform applications only after all resume operations are completed. If a USB module recognizes an external device while the kernel module is being resumed, the USB module also performs a resume operation. In that case, there is a problem that the entire resume time of the kernel module becomes long. As a result, the start time of the applications may be delayed.

Accordingly, there has been a need for technology that can quickly launch an application for a display device in response to a user command for turning on the display device being input.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a display device which enables a user to quickly turn on the display device and a method for controlling the same.

According to an aspect of an exemplary embodiment, there is provided a display device including a display configured to display an image; an interface configured to connect to at least one external device; and a controller configured to resume a configuration process of the display device in response to a command to turn on a power of the display device being input and control the interface to resume the at least one external device in response to the configuration process of the display device being completed.

The controller may be further configured to control the interface to hold on resuming the configuration process of the display device until the configuration process is completed.

The at least one external device may include at least one of a Wi-Fi module, a Bluetooth module, and a camera module.

The interface may be further configured to connect the at least one external device to the display device through a universal serial bus (USB) connector.

The configuration process of the display device may include configuring a kernel of the display device and a kernel driver.

The controller may be further configured to place a power state of the interface in an off-line state while the configuration process of the display is being resumed.

The controller may be further configured to control the interface to hold on resuming the configuration process of the display device until the configuration process is completed and supply power to the interface to resume the at least one external device in response to the configuration process being completed.

The display device may further include a plurality of external devices, including the at least one external devices, wherein the controller may be further configured to resume the plurality of external devices in sequence in response to the configuration process being completed.

The controller may be further configured to keep applying a reset signal of a low value to the interface while the configuration process of the display device is being resumed.

The controller may be further configured to apply a reset signal of a high value to the interface in response to the configuration process being completed.

According to another aspect of an exemplary embodiment, there is provided a method for controlling a display device, the method including: resuming a configuration process of the display device in response to a command to turn on a power of the display device being input; and controlling an interface of the display device to resume at least one external device connected through the interface in response to the configuration of the display device being completed.

The controlling may include controlling the interface to hold on resuming the configuration process of the display device until the configuration process is completed.

The external device may include at least one of a Wi-Fi module, a Bluetooth module, and a camera module.

The interface may be configured to connect the at least one external device to the display device through a universal serial bus (USB) connector.

The configuration process of the display device may include configuring a kernel of the display device and a kernel driver.

The controlling may include placing a power state of the interface in an off-line state while the configuration process of the display is being resumed.

The controlling may include controlling the interface to hold on resuming the configuration process of the display device until the configuration process is completed and supplying power to the interface to resume the at least external device in response to the configuration process being completed.

The controlling may include: controlling the interface to resume a plurality of external devices, including the at least one external devices, and resuming the plurality of external devices in sequence in response to the configuration process being complete.

The controlling may include applying a reset signal of a low value to the interface while the configuration of the display device is being resumed.

The controller may further include applying a reset signal of a high value to the interface in response to the configuration process being completed.

BRIEF DESCRIPTION OF THE DRAWINGS

The above and/or other aspects will be more apparent from the following detailed description when taken in conjunction with the accompanying drawings, in which.

DETAILED DESCRIPTION

Figure 1:
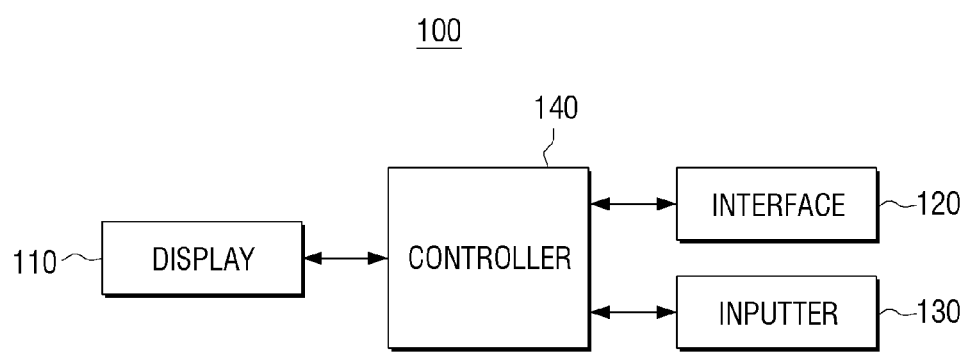
FIG. 1 is a block diagram illustrating a display device according to an exemplary embodiment.

Exemplary embodiments are described in greater detail below with reference to the accompanying drawings. In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

FIG. 1 is a block diagram illustrating a display device 100 according to an exemplary embodiment. As illustrated in FIG. 1, a display device 100 includes a display 110, an interface 120, an inputter 130, and a controller 140. The display device 100 may be a television (TV). However, this is merely exemplary, and the display device 100 may be implemented by various electronic devices, such as a portable phone having the display 110, a tablet personal computer (PC), a digital camera, a camcorder, a notebook PC, and a personal digital assistant (PDA).

The display 110 is a constituent element for displaying an image. The display 110 may display content that is received through a broadcasting channel. That is, the display device 100 may receive various kinds of broadcasting signals that are transmitted from broadcasting stations through a radio frequency (RF) communication network, and may receive content from various kinds of servers through an internet protocol (IP) network. The display 110 may display the received content.

The interface 120 is a constituent element for connecting the controller 140 of the display device 100 to an external device.

Specifically, an external device that is connected to the controller 140 through the interface 120 may include at least one of a Wi-Fi module, a Bluetooth module, and a camera module. However, this is merely exemplary, and the external device may differ depending on the function or kind of the display device 100.

The interface 120 may connect the external device to the display device 100 through Universal Serial Bus (USB) connection. Specifically, if a plurality of external devices are provided, the interface 120 may include a plurality of USB ports that are to be connected to respective external devices. Further, the interface 120 may connect a plurality of external devices to the display device 100 using a USB hub that can connect to the plurality of external devices. Embodiments of the interface 120 are not limited to USB connection. For example, the interface 120 may support IEEE 1394 Firewire the provides a high-bandwidth serial bus to interconnect a host controller and peripheral devices. The interface 120 may also provide Thunderbolt connection for communication between the display device 100 and the external device.

The inputter 130 is a constituent element for receiving an input of a user command. The inputter 130 receives a user command for controlling operations of the display device 100. In particular, the inputter 130 may receive a user command for turning on/off the power of the display device 100.

In this case, the inputter 130 may be implemented by a remote controller that includes up, down, left, and right direction keys and a confirm key. However, this is merely exemplary, and the inputter 130 may be implemented by various input devices, such as a touch screen, a mouse, and a pointing device.

The controller 140 is a constituent element for controlling the whole operation of the display device 100. In particular, if a user command for turning on the power of the display device 100 is input through the inputter 130, the controller 140 may resume a configuration process of the display device 100, and may control the interface 120 to resume communication flow between the display device 100 and external devices in sequence. The configuration process of the display device 100 may include configuring a kernel of the display device and a kernel driver.

The kernel may be an operating system (OS) for driving the display device 100. The kernel driver may be a device that is included in the same panel as an audio outputter or the display 110 or a device that is included in the display device 100, such as a tuner. Alternatively, the kernel driver may be a program which executes in kernel mode on the underlying hardware of the display device 100.

The controller 140, after resuming the kernel and the kernel driver, may supply power to the external device via the USB connection of the interface 120 and resume a configuration process in a preset order to communicate with the external device. Alternatively, the controller 140 may apply a reset signal of a low value to the interface 120 while resuming the configuration process of the display device 100 including configuring the kernel and the kernel driver. The controller 140 may apply a reset signal of a high value to the interface 120 in a preset order after the configuration process of the display device 100 is completed. That is, when the configuration process of the display device 100 is completed to turn on the display 110, the controller 140 may resume the external device.

Figure 2:
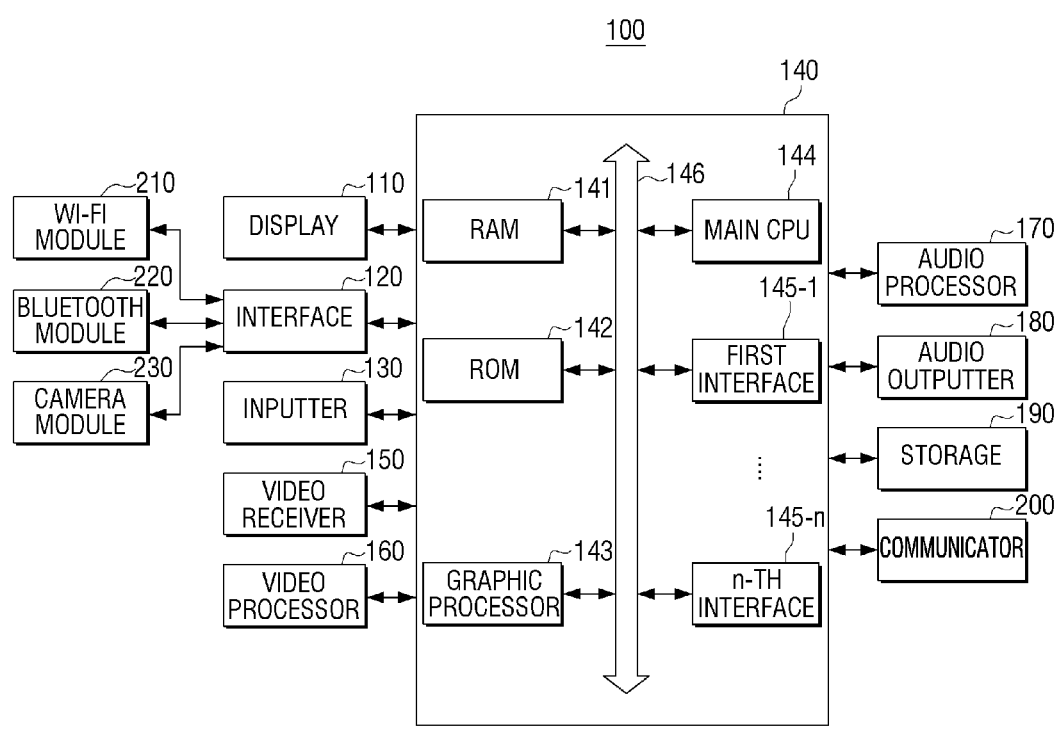
FIG. 2 is a block diagram illustrating a detailed configuration of a display device according to an exemplary embodiment.

Hereinafter, a detailed configuration of the display device 100 will be described in more detail with reference to FIG. 2. As illustrated in FIG. 2, the display device 100 includes a display 110, an interface 120, an inputter 130, a controller 140, a video receiver 150, a video processor 160, an audio processor 170, an audio outputter 180, a storage 190, a communicator 100, and a WI-FI device 210.

FIG. 2 exemplarily illustrates various kinds of constituent elements of the display device 100 having various features, such as a suspend mode to suspend RAM or hard disk operations, communication features, and image reproduction and display features. Thus, according to embodiments, a part of the constituent elements illustrated in FIG. 2 may be omitted or modified, or other constituent elements may be added.

The display 110 is a constituent element for displaying an image. The display 110 may display content that is received through broadcasting channels. Specifically, the display 110 may display video frames output from the video processor 160 and various screen images generated by a graphic processor 143. The video processor 160 may process video data received from the video receiver 150 and transmit the processed video data to the display 110 so that the display 110 may display the video frames.

If the display device 100 is resumed as a result of the configuration process of the display device 100 being completed under the control of the controller 140, the display 110 of the display device 100 is turned on. That is, if the resume of the configuration of the display device 100 is completed, the display 110 is resumed to be turned on.

The interface 120 is a constituent element for connecting the controller 140 of the display device 100 to an external device.

Specifically, the external device may include at least one of a Wi-Fi module, a Bluetooth module, and a camera module. However, this is merely exemplary, and the external device may differ depending on the type of the display device 100 and features therein.

The Wi-Fi module 210 is a constituent element for using a local area network (LAN). The Wi-Fi device 210 may enable the display device 100 wirelessly connect to a network source such as the Internet via a wireless access point (AP).

The Bluetooth module 220 is a constituent element for using wireless transmission technology between the display device 100 and an external electronic device (e.g., a portable phone or PC).

The camera module 230 is a constituent element for capturing an image. The camera module 230 may receive an input of an image of an object through conversion of a light signal input through a lens into an electrical signal through an image sensor. In this case, the object indicates all objects including a main object in the generated captured image and a background.

On the other hand, the interface 120 may connect the external device to the display device 100 through the USB connection. Specifically, if a plurality of external devices are provided, the interface 120 may include a plurality of USB ports that are to be connected to respective external devices. Further, the interface 120 may connect a plurality of external devices to the display device 100 through a USB hub that can connect to the plurality of external devices.

The inputter 130 is a constituent element for receiving an input of a user command. The inputter 130 receives a user command for controlling operations of the display device 100. In particular, the inputter 130 may receive a user command for turning on/off the power of the display device 100.

In this case, the inputter 130 may be implemented by a remote controller that includes up, down, left, and right direction keys and a confirm key. However, this is merely exemplary, and the inputter 130 may be implemented by various input devices, such as a touch screen, a mouse, and a pointing device.

The controller 140 may supply power to the external device via the USB connection of the interface 120 and resume a configuration process in a preset order to communicate with the external device. Alternatively, the controller 140 may apply a reset signal of a low value to the interface 120 while resuming the configuration process of the display device 100 including configuring the kernel and the kernel driver. The controller may apply a reset signal of a high value to the interface 120 in a preset order after the configuration process of the display device 100 is completed. Here, the reset signal of the low value may set the external device to its default unconfigured state to ensure that USB signaling for the external device starts from a known state. For example, the reset signal of the low value is generated by holding both two data signals D− and D+ less than 0.3V.

That is, the controller 140 may control resume time of the external device by controlling power supplied to the external device via a USB connection, or controlling a reset signal. A method of resuming the configuration of the display and an external device by the controller 140 will be described in more detail.

The video receiver 150 receives video data from various sources. For example, the video receiver 150 may receive broadcasting data from an external broadcasting station, may receive in real time video data from an external server, and may receive video data stored in the internal storage 190.

The video processor 160 is a constituent element that processes the video data received through the video receiver 150. The video processor 160 may perform various image processes, such as video data decoding, scaling, noise filtering, frame rate conversion, and resolution conversion.

The audio processor 170 is a constituent element that processes audio data. The audio processor 170 may perform various processes, such as audio data decoding, amplification, and noise filtering. The audio data processed by the audio processor 240 may be output to the audio outputter 180.

The audio outputter 180 outputs not only various kinds of audio data processed by the audio processor 170 but also various kinds of notification sound or voice messages. The audio outputter 180 may be implemented by a speaker. However, this is merely exemplary, and the audio outputter 180 may be implemented by an audio terminal.

The storage 190 stores various modules for driving the display device 100. For example, the storage 190 may store software including a base module, a sensing module, a communication module, a presentation module, a web browser module, and a service module. In this case, the base module is a basic module that processes signals transferred from hardware included in the display device 100 and transfers the processed signals to an upper layer module. The sensing module is a module that collects information from various kinds of sensors and analyzes and manages collected information, and may include a face recognition module, a voice recognition module, a motion recognition module, and an near field communication (NFC) recognition module. The presentation module is a module for forming a display screen, and may include a multimedia module for reproducing and outputting multimedia content, and a user interface (UI) rendering module for performing UI and graphic processing. The service module is a module that includes various kinds of applications for providing various services.

As described above, the storage 190 may include various program modules, but the various kinds of program modules may be partially omitted, modified, or added depending on the kind and characteristics of the display device 100. For example, if the above-described display device 100 is implemented by a smart phone, the base module may further include a position determination module for determining a position based on global positioning system (GPS), and the sensing module may further include a sensing module for sensing user's motion.

If a user command for turning off the power of the display device 100 is input through the inputter 130, the storage 190 may store the operating state of the display device 100.

That is, the display device 100 may store the state of a hardware drive when the power of the display device 100 is turned off in the storage 190 to use a suspend mode, such as suspend-to-RAM mode or suspend-to-disk mode. Accordingly, the display device 100 can preserve the contents stored in the storage 190 such as a DRAM using a self-refresh operation of a DDR memory of the storage 190 in a suspend mode. Further, if a user command for turning on the power of the display device 100 is input by a user, the display device 100 can quickly preserve the operating state before the power is turned off.

On the other hand, the communicator 200 is a configuration that performs communication with various types of external devices according to various types of communication methods. The communicator 200 includes various communication modules, such as a Wi-Fi module 210, a Bluetooth module 220, which are connected through the interface 120, and an near field communication (NFC) module. In this case, the Wi-Fi module 210, the Bluetooth module 220, and the NFC module perform communication in a Wi-Fi method, a Bluetooth method, and an NFC method, respectively. Among them, the NFC module operates in an NFC method using 13.56 MHz frequency band among various RF-ID frequency bands, such as 135 kHz, 13.56 MHz, 433 MHz, 860 to 960 MHz, and 2.45 GHz. In the case of using the Wi-Fi module 210 or Bluetooth module 220, various kinds of connection information, such as service set identification (SSID) and session key, are first transmitted or received to connect communication, and various kinds of information can be transmitted or received through the connected communication.

The controller 140 controls operations of the display device 100 using various kinds of programs stored in the storage 190. In particular, if a user command for turning on the power of the display device 100 is input through the inputter 130, the controller 140 may resume a configuration process of the display device 100, and then controls the interface 120 to resume communication flow between the display device 100 and at least one external device.

Specifically, the controller 140 may supply power to the external device via a USB connection of the interface 120 and resume a configuration process in a preset order. Alternatively, the controller 140 may apply a reset signal of a low value to the interface 120 while resuming the configuration process of the display device 100 including configuring the kernel and the kernel device. The controller 140 may apply a reset signal of a high value to the interface 120 in a preset order after the configuration process is completed.

That is, the controller 140 may control resume of the external device connected to the display device 100, by controlling power supplied to the external device via the USB connection.

Alternatively, the controller 140 may control the external device not to be resumed while resuming the configuration process of the display device 100 by applying a reset signal of a low value to the interface 120. After another configuration of the display device 100 is resumed, the controller 140 may control that the external device connected to a USB is successively resumed, by applying to a USB a reset signal of a high value in a preset order.

As illustrated in FIG. 2, the controller 140 includes a random-access memory (RAM) 141, a read-only memory (ROM) 142, a graphic processor 143, a main central processing unit (CPU) 144, first to n-th interfaces 145-1 to 145-n, and a bus 146. In this case, the RAM 141, the ROM 142, the graphic processor 143, the main CPU 144, and the first to n-th interfaces 145-1 to 145-n may be connected to each other through the bus 146.

A command set for system booting is stored in the ROM 142. If a turn-on command is input to supply the power, the main CPU 144 copies the OS (Operating System) stored in the storage 190 into the RAM 141 according to a command stored in the ROM 142, and boots the system through execution of the OS. If the booting is completed, the main CPU 144 copies various kinds of application programs stored in the storage 190 into the RAM 141, and performs various kinds of operations through execution of the application program copied into the RAM 141.

The graphic processor 143 generates a screen image that includes various objects, such as icon, image, and text, using an operator (not illustrated) and a renderer (not illustrated). The operator operates attribute values, such as coordinate values, shapes, sizes, and colors of the objects to be displayed according to the layout of the screen using a control command received through the inputter 130. The renderer generates a screen image of various layouts including objects based on the attribute values operated by the operator. The screen that is generated by the renderer is displayed in the display region of the display 110. In particular, the graphic processor 143 may generate a list of external devices and a content list in response to a user command.

The main CPU 144 accesses the storage 190 and performs booting using the OS stored in the storage 190. Further, the main CPU 144 performs various operations using various kinds of programs, content, and data stored in the storage 190.

The first to n-th interfaces 145-1 to 145-n are connected to various kinds of constituent elements as described above. One of the interfaces may be a network interface that is connected to an external device through a network.

As such, a user can quickly turn on the display 110 by resuming the external device after the configuration of the display device 100 is resumed.

Figure 3:
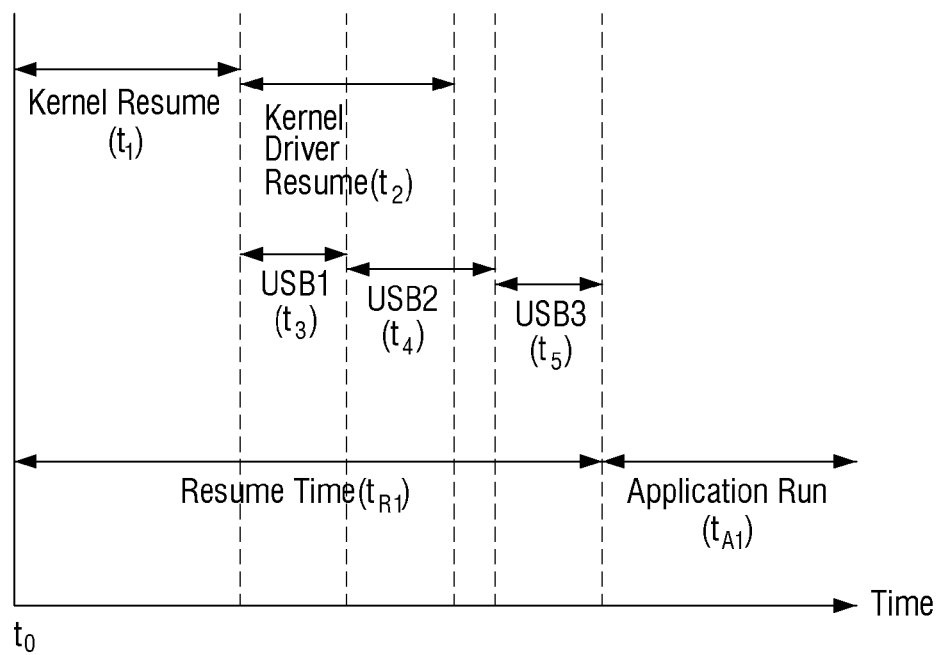
FIG. 3 illustrates a resume time of a display device in the related art.

FIG. 3 is a diagram illustrating a flow of resume time of a display device according to a method in the related art.

If a user command for turning on a display device is input at $t_0$, the display device resumes kernel. The kernel may be an operating system (OS) for driving the display device. As shown in FIG. 3, time $t_1$ is required to resume the kernel. If the kernel is resumed, the display device resumes a kernel driver. As shown in FIG. 3, time $t_2$ is required to resume the kernel driver.

Further, the display device is relatively larger than a small electronic device, such as a portable phone, and thus may be connected to an external device using a USB connection. That is, the external device, such as an Wi-Fi module, an Bluetooth module, or an camera module, and an controller of the display device may be connected via the USB connection. Accordingly, the display device resumes the kernel driver and at least one external device connected using the USB connection. As shown in FIG. 3, time $t_3$ is required to resume an external device connected to a USB1 port of the display device, time $t_4$ is required to resume an external device connected to a USB2 port of the display device, and time $t_5$ is required to resume an external device connected to a USB3 port of the display device. Even if the resume of the kernel driver is completed, the resume of the external devices connected to the USB1 port, USB2 port, and USB3 port may not be completed. Accordingly, an application of the display device cannot be operated until the resume of all the external devices is completed at $t_{R1}$.

Thus, when the application is required to operate the display, the display cannot be turned on until time period $t_{R1}$ passes in the case a user command for turning on the display device is input at time $t_0$.

Figure 4:
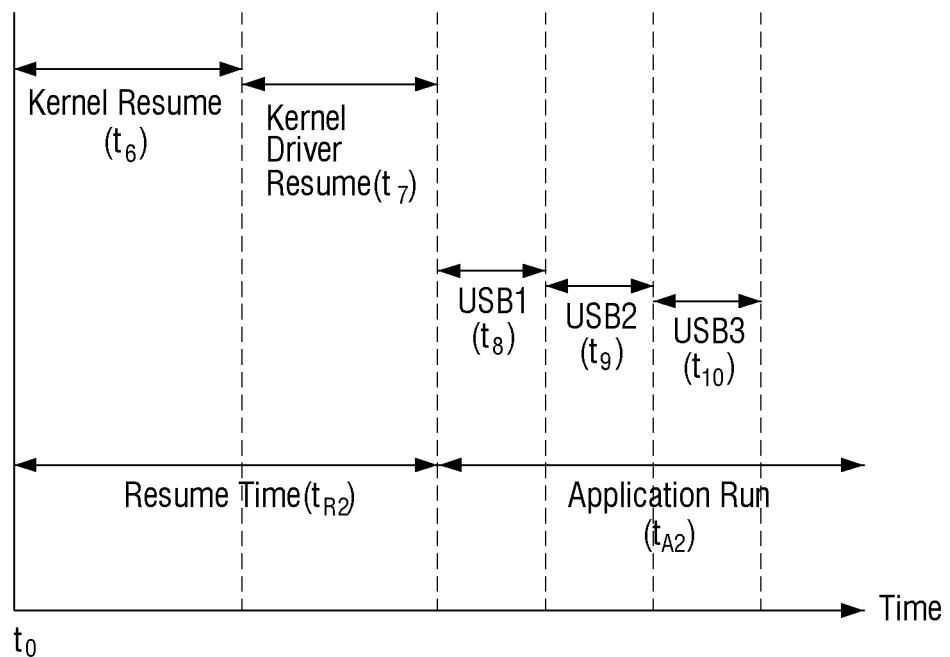
FIG. 4 illustrates a resume time of a display device according to an exemplary embodiment.

In order to quickly turn on the display 110, the order of resumes of the kernel, the kernel drive, and the external device according to one exemplary embodiment, is set differently from that in the related art. FIG. 4 illustrates flow of resume time of the display device 100 according to an exemplary embodiment.

As illustrated in FIG. 4, if a user command for turning on the display device 100 is input at $t_0$, the display device 100 starts resuming kernel. The kernel may be an operating system (OS) for driving the display device 100. As shown in FIG. 4, time $t_6$ is required to resume the kernel. If the kernel is resumed, the display device 100 starts resuming the kernel driver. The kernel driver may be a device that is included in a panel, such as the audio outputter or the display 110, or in the display device 100, such as a tuner. Alternatively, the kernel driver may be a program which executes in kernel mode on the underlying hardware of the display device 100. As shown in FIG. 4, time $t_7$ is required to resume the kernel driver.

The display device 100 may operate not to start the resume of the external device connected using the USB until the resume of the whole configuration of the kernel driver is completed. That is, if the resume of the display 110 is completed after time $t_7$ for resuming the kernel driver, the controller 140 can resume the external device connected using the USB in the preset order. A detailed method for operating not to start the resume of the external device will be described later.

To be specific, after the display 110 is turned on, the controller 140 may resume the external device connected to the USB1 port for time $t_8$, resume the external device connected to the USB2 port for time $t_9$, and resume the external device connected to the USB3 port for time $t_{10}$.

Accordingly, the controller 140 can control the display 110 to start the operation of the application at $t_{42}$ while performing the resume of the external device. In other words, a user may view contents displayed by the display device 100 while resuming the external device.

Hereinafter, referring to FIGS. 5 to 8, a method for the controller 140 to control the resume time of the external device will be described in detail.

Figure 5:
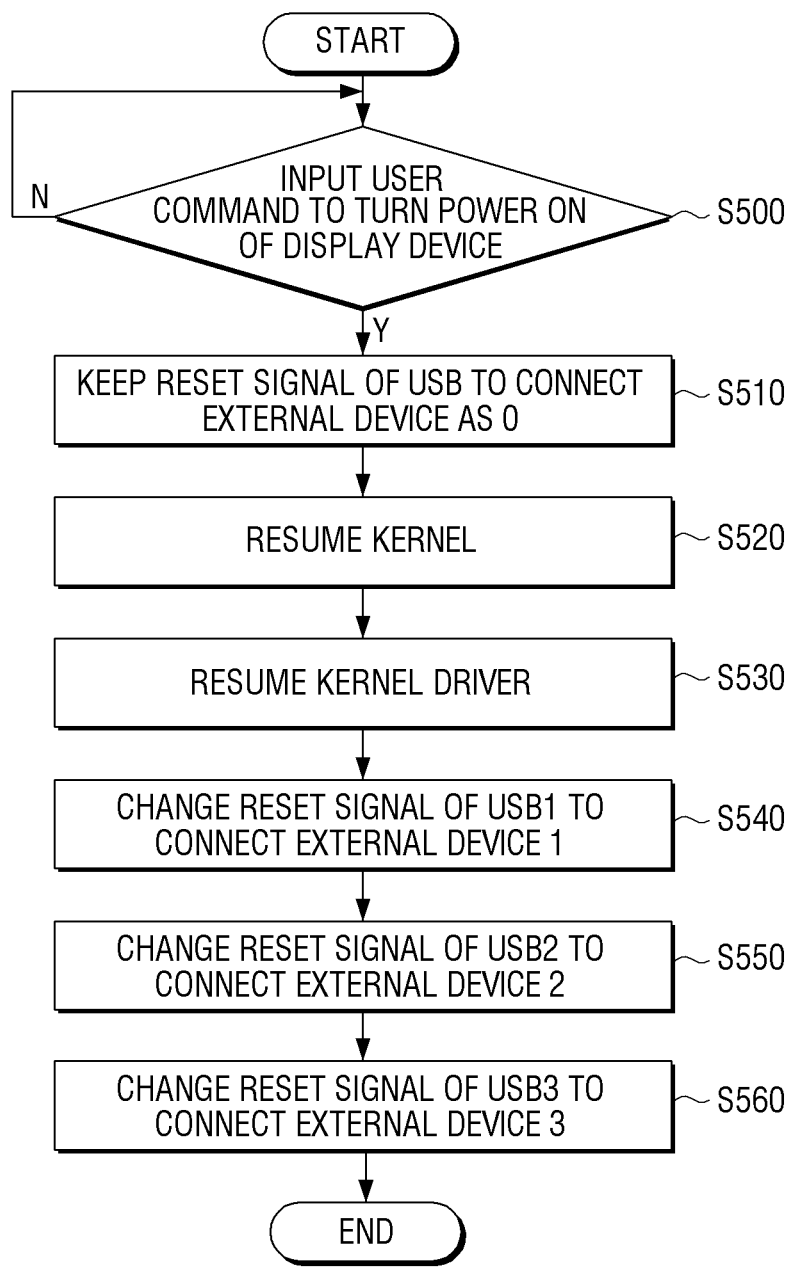
FIG. 5 is a flowchart illustrating a method for controlling a display device according to an exemplary embodiment.

FIG. 5 is a flowchart illustrating a method for controlling a resume time of an external device using a reset signal.

First, the display device 100 determines whether a user command for turning on the display device 100 is input (S500). The user command may be input through the inputter 130.

If it is determined that the user command for turning on the display device 100 is input (S500-Y), the display device 100 keeps a reset signal of the interface 120 to which the external device is connected as 0. Then, the display device 100 resumes the kernel (S520), and resumes the kernel driver (S530). The kernel may be an operating system (OS) for driving the display device 100. The kernel driver may be a device that is included in a panel, such as the audio outputter or the display 110, or in the display device 100, such as a tuner. Alternatively, the kernel driver may be a program which executes in kernel mode on the underlying hardware of the display device 100. While the kernel and the kernel driver are being resumed, the display device 100 may control so that the external device is not resumed by keeping the reset signal of the interface 120 as 0.

If the resume of the kernel driver is completed, the display 110 is turned on. After the display 110 is turned on, the display device 100 changes the reset signal of at least one USB port of the interface 120 from 0 to 1. That is, if there are USB1 port, USB2 port, and USB3 port, to which external device 1, external device 2, and external device 3 are respectively connected, the display device 100 changes the reset signal of USB1 port from 0 to 1 (S540). Accordingly, the display device 100 may resume external device 1. Further, the display device 100 changes the reset signal of USB2 port from 0 to 1 (S550). Accordingly, the display device 100 may resume external device 2. Further, the display device 100 changes the reset signal of USB3 port to from 0 to 1 (S560). Accordingly, the display device 100 may resume external device 3.

The order of changing the reset signals of the USB ports from 0 to 1 may vary according to initial setting of the display device 100. According to frequency of use and necessary order of the external devices of the display device 100, the order of resuming the external devices may be stored as initial setting. The order of resuming the external device may be set as the order desired by a user. However, this is merely exemplary, and a plurality of external devices may be resumed at the same time.

Figure 6:
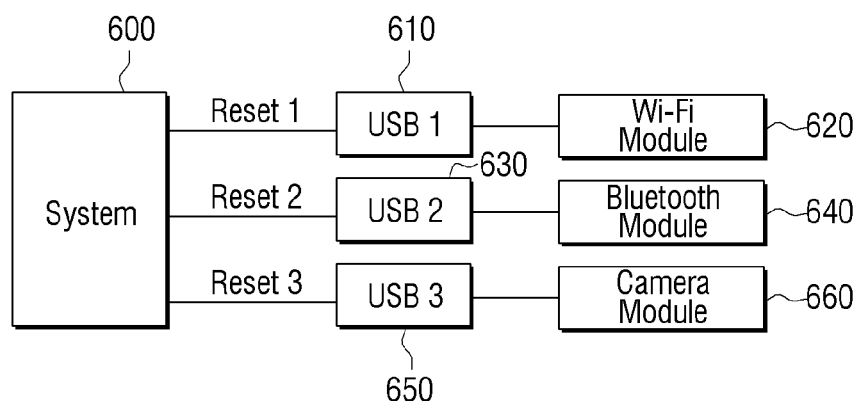
FIG. 6 is a diagram illustrating an interface according to an exemplary embodiment.

For example, as illustrated in FIG. 6, a Wi-Fi module 620 may be connected to a display device system 600 through a USB1 port 610, a Bluetooth module 640 may be connected to the display device system 600 through a USB2 port 630, and a camera module 660 may be connected to the display device system 600 through a USB3 port 650. In this case, the display device 100 may change the reset signals of the USB1 port 610, the USB2 port 630, and the USB3 port 650 sequentially. Accordingly, the display device may firstly resume the Wi-Fi module 620, secondly resume the Bluetooth module 640, and thirdly resume the camera module 660.

Figure 7:
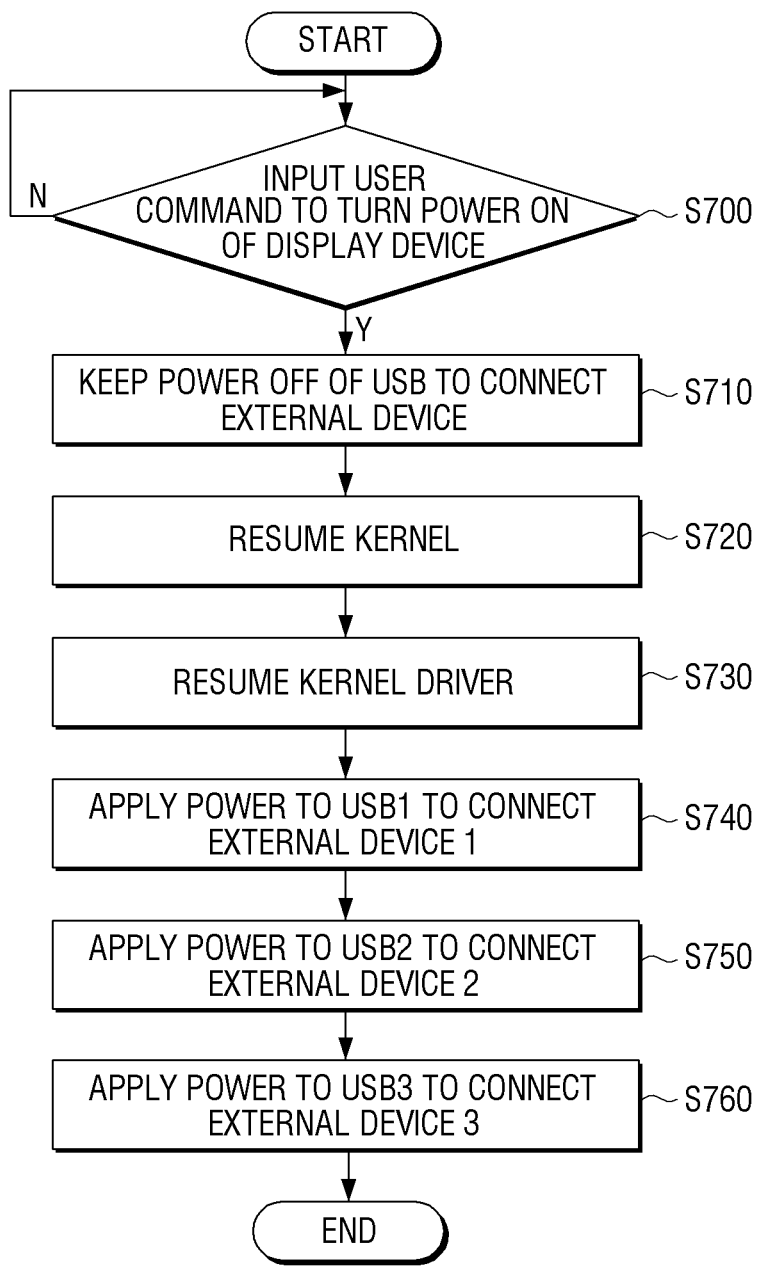
FIG. 7 is a flowchart illustrating a method for controlling a display device according to another exemplary embodiment.

FIG. 7 is a flowchart illustrating a method for controlling a resume time of an external device through controlling of a power apply time.

First, the display device 100 determines whether a user command for turning on the display device 100 is input (S700). The user command may be input through the inputter 130.

If it is determined that the user command for turning on the display device 100 is input (S700-Y), The display device 100 keeps power to the interface 120 in an off-line state. Then, the display device 100 resumes the kernel (S720), and resumes the kernel driver (S730). The kernel may be an operating system (OS) for driving the display device 100. The kernel driver may be a device that is included in a panel, such as the audio outputter or the display 110, or in the display device 100, such as a tuner. While the kernel and the kernel driver are resumed, the display device 100 may operate not to resume the external device by not supplying power to an external device connected to the interface 120.

If the resume of the kernel driver is completed, the display 110 is turned on. After the display 110 is turned on, the display device 100 supply power to the external device via at least one USB port. That is, if there are USB1 port, USB2 port, and USB3 port to which external device 1, external device 2, and external device 3 are respectively connected, the display device 100 supplies power external device 1 via USB1 port (S740). Accordingly, the display device 100 can resume external device 1. Further, the display device 100 supplies power to connect external device 2 via USB2 port (S750). Accordingly, the display device 100 may resume external device 2. Further, the display device 100 supplies power to external device 3 via USB3 port (S760). Accordingly, the display device 100 may resume external device 3 via USB3 port.

The order of supplying power to the external devices may vary according to initial setting of the display device 10. According to frequency of use and necessary order of the external device of the display device 100, the order of resuming the external devices may be stored as initial setting. The order of resuming the external devices may be set as the order desired by a user. However, this is merely exemplary, and a plurality of external devices may be resumed at the same time.

Figure 8:
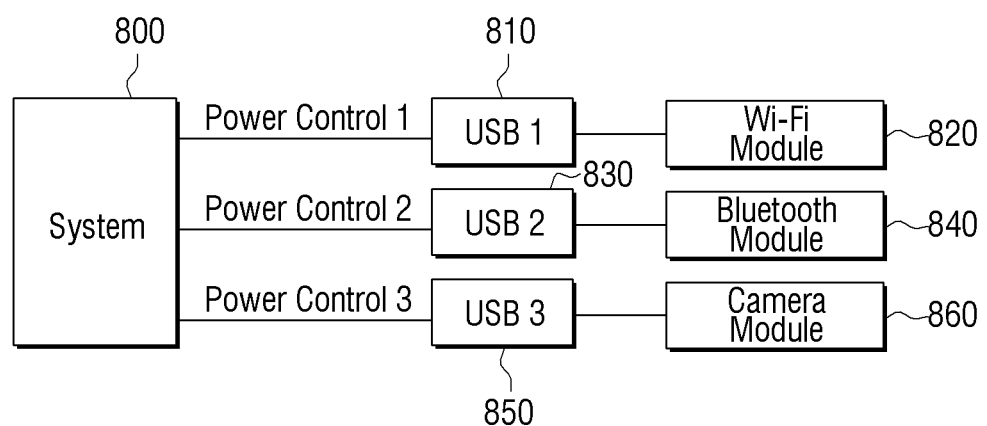
FIG. 8 is a diagram illustrating an interface according to another exemplary embodiment.

For example, as illustrated in FIG. 8, a Wi-Fi module 820 may be connected to a display device system 800 through a USB1 port 810, a Bluetooth module 840 may be connected to the display device system 600 through a USB2 port 830, and a camera module 860 may be connected to the display device system 800 through a USB3 port 850. At this time, the display device 100 may supply power to the USB1 port 810, the USB2 port 830, the USB3 port 860 sequentially. Accordingly, the display device may firstly resume the Wi-Fi module 820, secondly resume the Bluetooth module 840, and thirdly resume the camera module 860.

Figure 9:
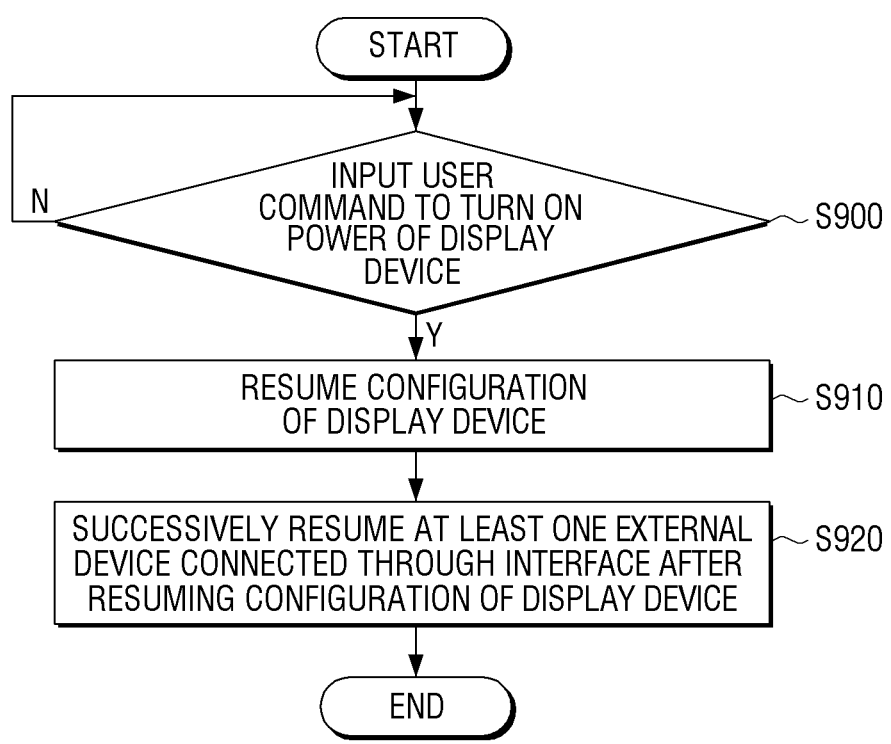
FIG. 9 is a flowchart illustrating a method for controlling a display device according to still another exemplary embodiment.

FIG. 9 is a flowchart illustrating a method for controlling a display device according to still another exemplary embodiment.

First, the display device 100 determines whether a user command for turning on the power of the display device 100 is input (S900). If it is determined that the user command for turning on the power of the display device 100 is input (S900-Y), the display device 100 resumes a configuration of the display device (S910). The configuration of the display device 100 may include a kernel of the display device and a kernel driver.

The kernel may be an operating system (OS) for driving the display device 100. The kernel driver may be a device that is included in a panel, such as the audio outputter or the display 110, or in the display device 100, such as a tuner. Alternatively, the kernel driver may be a program which executes in kernel mode on the underlying hardware of the display device 100.

After resuming the configuration of the display device, the display device 100 successively resume at least one external device connected through the interface 120 (S920). The external device may include at least one of a Wi-Fi module 210, a Bluetooth module 220, and a camera module 230. However, this is merely exemplary, and the external device may differ depending on the type of the display device 100 or features therein. The display device 100 may resume the external device by supplying power to the interface 120 to connect the external device in a preset order. Alternatively, the display device 100, while resuming the configuration of the display device 100, may apply a reset signal of a low value to the interface 120 to connect the external device, and after resuming the configuration of the display device 100, apply the reset signal of a high value to the interface 120 to connect the external device in a preset order. As described above, according to various embodiments of the present disclosure, if a user command for turning on the display device is input, the user can quickly turn on the display of the display device that controls the resume time of the external device connected via the interface 120.

As described above, according to various exemplary embodiments, the user can quickly turn on the display device.

The method for controlling the display device according to the various embodiments as described above may be coded by software and stored in a non-transitory readable medium. The non-transitory readable medium may be mounted on various devices to be used.

The non-transitory computer readable medium is not a medium that stores data for a short period, such as a register, a cache, or a memory, but means a medium which semi-permanently stores data and is readable by a device. Specifically, various applications and programs as described above may be stored and provided in the non-transitory computer readable medium, such as, a CD, a DVD, a hard disc, a Blu-ray disc, a USB, a memory card, and a ROM.

While exemplary embodiments have been shown and described, it will be understood by those skilled in the art that various changes in form and detail may be made therein without departing from the spirit and scope of the inventive concept, as defined by the appended claims.

What is claimed is:

1. A display device comprising:
a memory;
a display configured to display an image;
an interface configured to connect to at least one universal serial bus (USB) device using at least one port; and
a controller configured:
to store, in a power-on state of the display device, information for configuring an operating system and at least one hardware device included in the display device in the memory,
to preserve, in a power-off state of the display device, the information stored in the memory,
in response to a command to turn on a power of the display device being received in the power-off state of the display device, to resume a configuration of the display device, configuring the operating system and the at least one hardware device included in the display device using the information preserved in the memory, and
to start to supply the power to the at least one port and apply a reset signal to the at least one port to connect to the at least one USB device, in response to a configuration of the operating system and the at least one hardware device included in the display device being completed to turn on the display,
wherein the controller is further configured to control the interface to hold a resuming operation of the at least one USB device until the display is turned on, and with respect to an application related to an operation of the display, to control to start an operation of the application while resuming the at least one USB device.

2. The display device of claim 1, wherein the at least one USB device comprises at least one of a Wi-Fi module, a Bluetooth module, and a camera module.

3. The display device of claim 1, wherein the interface is further configured to connect the at least one USB device to the display device through a universal serial bus (USB) connector.

4. The display device of claim 1, wherein the configuration of the display device comprises configuring a kernel of the display device and a kernel driver.

5. The display device of claim 1, wherein the controller is further configured to place a power state of the interface in an off-line state while the configuration of the display device is being resumed.

6. The display device of claim 1, wherein the controller is further configured to control the interface to hold on starting to resume the at least one USB device until the configuration of the display device is completed.

7. The display device of claimed in claim 1, wherein the controller is further configured to keep applying the reset signal of a low value to the at least one port while the configuration of the display device is being resumed.

8. The display device of claim 7, wherein the controller is further configured to apply the reset signal of a high value to the at least one port in response to the configuration of the display device being completed.

9. A method for controlling a display device comprising a display, the method comprising:
storing in a memory, in a power-on state of the display device, information for configuring an operating system and at least one hardware device included in the display device in the memory;
preserving, in a power-off state of the display device, the information stored in the memory;
in response to a command to turn on a power of the display device being received in the power-off state of the display device, resuming a configuration of the display device, configuring the operating system and the at least one hardware device included in the display device using the information preserved in the memory, and
starting to supply the power to at least on port and apply a reset signal to the at least one port to connect to at least one at least one universal serial bus (USB) device, in response to a configuration of the operating system and the at least one hardware device included in the display device being completed to turn on the display,
wherein the at least one port is controlled to hold a resuming operation of the at least one USB device until the display is turned on, and with respect to an application related to an operation of the display, an operation of the application is controlled to start while resuming the at least one USB device.

10. The method of claim 9, wherein the at least one USB device comprises at least one of a Wi-Fi module, a Bluetooth module, and a camera module.

11. The method of claim 9, wherein the at least one USB device is connected to the display device through a universal serial bus (USB) connector.

12. The method of claim 9, wherein the configuration of the display device comprises configuring a kernel of the display device and a kernel driver.

13. The method of claim 9, further comprising placing a power state of the at least one port in an off-line state while the configuration of the display is being resumed.

14. The method of claim 9, further comprising controlling the at least one port to hold on starting to resume the at least one USB device until the configuration of the display device is completed.

15. The method of claim 9, further comprising applying the reset signal of a low value to the at least one port while the configuration of the display device is being resumed.

16. The method of claim 15, further comprising applying the reset signal of a high value to the at least one port in response to the configuration of the display device being completed.

* * * * *